3,105,216
POTENTIOMETER
John Clayton, Jr., Maynard, and Lloyd Morton, Jr., Belmont, Mass., assignors to Waters Manufacturing, Inc., Wayland, Mass., a corporation of Massachusetts
Filed Dec. 19, 1960, Ser. No. 76,638
14 Claims. (Cl. 338—174)

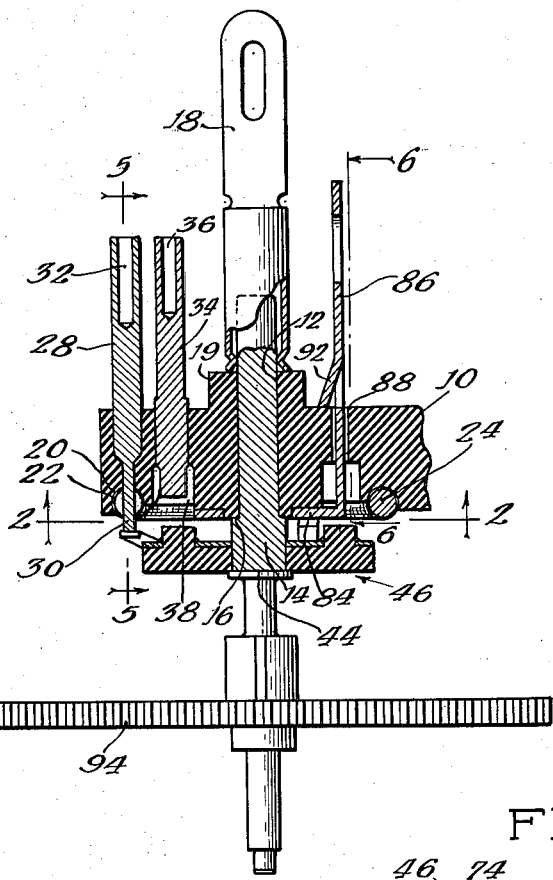

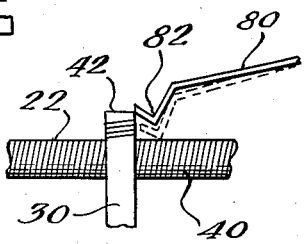
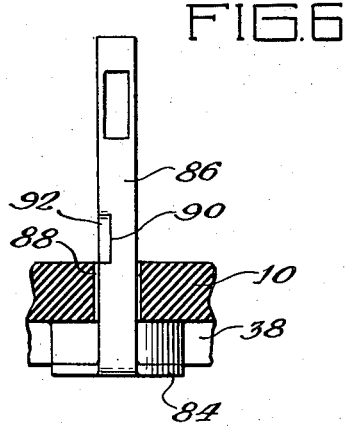
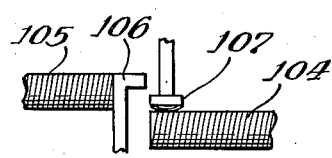
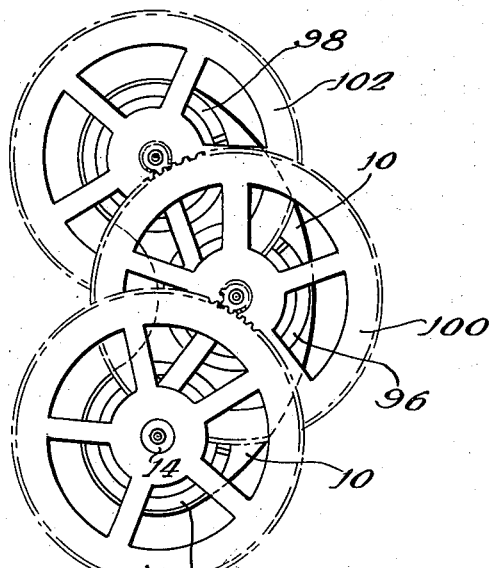
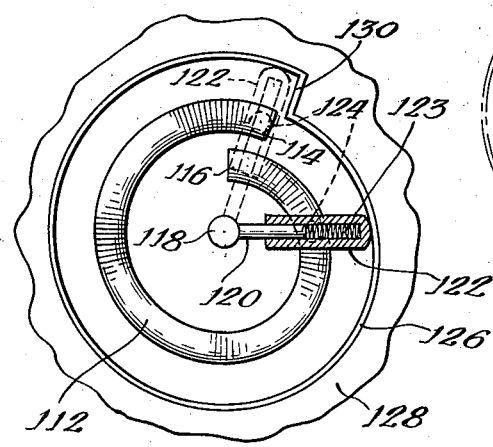

This invention relates to an improved construction for potentiometers, and more particularly for potentiometers of the rotary type.

The invention stems from a need for a potentiometer of a very low cost construction, but of the highest reliability, capable of serving as a shaft-position transducer in telemetry applications for periods of time of the order of decades. In the particular application of such a potentiometer in connection with which the present invention was made, the potentiometer was incorporated in a transducer system having a plurality of such transducer components, the shafts being coupled by a gear system with successive reductions, the shaft of the fastest-driven potentiometer being driven externally, the purpose of the over-all transducer being to produce an integrated indication of the total rotation of the external shaft, the speed of this rotation being so slow that even the fastest-driven of the potentiometers would have a period or cycle of the order of months, while the slowest-moving might not go through a complete cycle for many years.

In one aspect, the present invention is directly related to previously unknown problems in potentiometer design which were found to flow from the extremely slow speeds of rotation just mentioned. An obvious and well-known problem in the design of potentiometers which do not employ limit stops for the rotational motion is the matter of preventing discontinuity of indication in the region of wiper travel between the insulated ends or terminals of the resistance element. It was heretofore believed that this problem had been solved completely satisfactorily by the precision techniques for the manufacture of potentiometers, particularly wire-wound potentiometers, which have been developed in recent years. These techniques have enabled the manufacture of resistance elements of circular configuration with ends or terminals so closely spaced on the circle as to produce no perceptible gap in the circle, but nevertheless fully mutually insulated. Thus there have long been known circular potentiometers of this type in which, with a voltage applied to the resistance winding, rotation of the wiper at even "extremely slow" speeds of once a day or so would produce sharp step-functions in wiper voltage, with no discernible ambiguity in wiper position, and nevertheless without producing a short by having the wiper in contact with both ends of the resistance simultaneously. Although it was of course known that from a theoretical standpoint some discontinuity or ambiguity should occur, the problem was considered as nonexistent with modern techniques of precision potentiometer manufacture, permitting the end windings of the resistance element to be so closely spaced as to make the gap visible only with great magnification. No discontinuity or ambiguity being observable with any then-known method of measurement, it was assumed that this theoretical problem had been made negligible by modern techniques of potentiometer manufacture.

However, when a potentiometer which had been made as precise as possible in this respect was sought to be used at the heretofore unheard-of slow rates mentioned above, it was found that the theoretical fault was not in fact merely theoretical, but was a practical obstacle to a satisfactory telemetering device. Potentiometers were constructed with extremely fine wire windings, in the manner heretofore deemed satisfactory to deal with such problems, the gap between the ends of the winding being matched substantially exactly to the width of the contact area of the wiper (which becomes far from negligible when dealing with the extremely small dimensions here under consideration). By great care in the construction, it was possible to achieve such perfect matching of the gap between the end windings (invisible to the naked eye) and the contact width that it was not possible by any type of manual operation to produce any condition of shorting between the ends of the element or ambiguity in read-out as the wiper was moved through the critical position. In further testing, the potentiometer was driven by a motor of the lowest possible speed readily obtainable, and strip-chart recording of the tap voltage showed a steep step-function with negligible rise (or fall) time as the wiper passed the gap. A long series of experiments with attempts to stop the operation in the midst of the passage of the wiper between the ends was unsuccessful and it was concluded that neither shorting nor open-circuiting would seriously interfere with the telemetering of the shaft position. Three of such potentiometers were then driven by a gear arrangement in which the motions of the externally driven potentiometer shaft were geared down by high ratios, and again no shorting or ambiguity of position of even the slowest of the potentiometers could be observed.

However, when it was attempted to use the device last described for the intended purpose of telemetering the number of rotations of the shaft of a household water-meter, the speeds involved being so slow as to give the last or slowest potentiometer a cycling time of the order of years, the device proved unacceptable for its intended purpose. Despite the greatest care and precision in manufacture, it was found impossble to produce a construction for the slowest-moving potentiometer which would not produce minutes, or even hours, of either shorting or ambiguous and erratic voltage readings as the wiper passed through the critical region between ends of the resistance element. When the gap was made sufficiently large to prevent shorting of the element by the width of the wiper, there were produced wide and randomly varying swings or oscillations of wiper voltage as the wiper went through the critical area, no intelligible reading being obtainable. Since the nature of the application for which the potentiometer was designed required that readings be taken at the remote location in a matter of a minute or so, and since temperature effects, etc., made it clear that even the carrying of the precision and expense of manufacture to a much further point would not produce satisfactory operation, the general type of telemetering described above was not deemed satisfactory for such an application until the present invention.

By the present invention, the problem described above is not only solved to the extent of producing fully satisfactory operation, but indeed it is solved to the extent of substantially eliminating the necessity for extreme precision in manufacture heretofore thought to be needed for such a device. Generally speaking, this is done in the present invention by more or less disregarding the matter of matching between the gap and the width of the contact surface of the wiper, the gap being made substantially greater than the width of the contact surface, to permit relatively large tolerance in manufacture of both these portions of the device, and there are provided means operable upon progression of the wiper on one end portion of the resistance element to simultaneously take the wiper out of contact with the end portion which it has reached and place it in contact with the other end portion, the wiper being "snapped," rather than gradually progressed, through this portion of its path. Such snap-action, of course, inherently loses precision of correspondence between wiper voltage and position in the small angular region involved. However, when it is seen that with the gearing arrangement described, the faster moving potentiometers constitute in essence micrometers for the coarser motion of the slowest-geared potentiometer, no over-all loss of precision whatever is entailed. Further, it may be observed that even the use of such snap-action on the directly driven shaft produces no consequential effect on the over-all accuracy of indication, since the region of the gap may be made a minuscule portion of the circular rotation, which is in turn, because of the gearing, a minuscule portion of the total capacity of the telemetering instrument. Thus the present manner of elimination of the problem of the gap produces no substantial effect on accuracy of indication.

In the embodiment of the broader aspects of the invention to be herein described at length, the snap action of the wiper mentioned above is accomplished in a very simple manner, being obtained from the same spring force which holds the wiper in contact with the resistance in conventional potentiometer construction. In this construction, one end of the element is spaced from the other not only in the general plane of travel of the wiper but also in the direction in which the wiper contacts the element, i.e., the path of the wiper on the resistance element has a "step" at the end points of the resistance element, so that the wiper, as it progresses, abruptly snaps down from contact with one end to contact with the other end. In the embodiment to be fully described, the spring action of the contact is of a general type in common use, i.e., one in which the wiper spring action is not exactly and completely normal to the resistance element but is also slightly forward, so that as the contact snaps off the "upper" step onto the "lower" step, it is automatically and instantaneously moved slightly forward from the "upper" step, thus permitting the use of a simple pin of uniform diameter as the "step," no recesses or insulators being required to assure that the wiper cannot contact both ends of the element at the same time.

One requirement of the telemetry of water-meter indications, a particular application for which the present invention is well suited, is the necessity of capability of mass production at low cost. As previously indicated, the aspect of the invention discussed above, in addition to solving a problem of a very unusual nature, does so in a manner contributing substantially to the desired objective of low cost. Other features of construction contributing to the same general object of low cost are also incorporated in the construction to be described herein, and still other features of construction, and further aims and advantages achieved thereby, will become clear from the embodiments of the invention shown in the appended drawing in which:

FIGURE 1 is a sectional view of a potentiometer embodying the invention, taken along two angularly displaced radii, as indicated by the angular line 1—1 in FIGURE 2;

FIGURE 2 is an elevational view of the stationary portion of the potentiometer of FIGURE 1, partially in section taken along the line 2—2;

FIGURE 3 is a view in elevation of a rotary contact or wiper assembly constituting a portion of the potentiometer;

FIGURE 4 is a view in side elevation of the wiper assembly of FIGURE 3, partially broken away in section along line 4—4 of that figure;

FIGURE 5 is an enlarged fragmentary detail view taken along the line 5—5 of FIGURE 1;

FIGURE 6 is an enlarged detail view taken along the line 6—6 of FIGURE 1 in the direction indicated by arrows;

FIGURE 7 is a view in elevation of a telemetering device comprising three potentiometers, including that of FIGURE 1 and two similar potentiometers successively geared together;

FIGURE 8 and FIGURE 9 are views more or less corresponding to FIGURE 5, but illustrating variants of construction which may be employed; and FIGURE 10 is a more or less schematic view of a further variant construction in accordance with the teachings of the invention.

The potentiometer of FIGURES 1 through 6 employs, as the base or mounting therefor, a plastic base plate 10 having a shaft aperture 12 through which the shaft 14 of the potentiometer extends, a shoulder 16 on the shaft 14 seating on the inner surface of the base plate 10, and a hollow clip 18 engaging the shaft 14 serving, with auxiliary shaft-positioning means (not shown), to mount the shaft for rotation in the plate, which is of a plastic suitable for serving as a bearing and is formed with a boss or hub 19 on the outer surface to elongate the bearing thus formed.

Radially spaced from the shaft 14 is a circular resistance element seat 20 of semi-circular cross section. The resistance winding 22, toroidally wound on a mandrel 24, is seated in the seat 20, and secured by suitable cement. The mandrel 24 has a small gap at 26. A terminal rod 28 is mounted in the plate 10 with its inner end reduced in size to form a pin 30 extending through the gap 26 somewhat beyond the inner plane of the toroidal resistance element (see FIGURE 5). The hollow outer end 32 of the terminal rod 28 is adapted for soldering of a suitable lead. A second terminal rod 34 is slightly radially inward from the rod 28; its hollow outer end 36 is similar to that of the rod 28, but the inner end of rod 34 is somewhat shorter and terminates in an annular recess 38 on the inner surface of the plate 10. One end 40 of the resistance wire is soldered or welded to the inner end of rod 34, and the other end 42 of the resistance wire is wound on, and soldered or welded to, the inner end of the pin 30. The rods 28 and 34 thus serve as external connecting terminals for the ends of the resistance element, the purpose of the inward extension of pin 30 being later described.

Seated on a bead or flange 44 on the shaft 14 is a wiper assembly generally designated by the number 46. As shown in FIGURES 3 and 4, this assembly employs a plastic base disc 48 with two integrally formed lugs 50 extending from one face thereof. The disc is centrally apertured at 52, with a key at 54 locking it to the shaft, which is provided with a suitable key-slot (not shown). A generally circular wiper plate 56 having apertures 58 in register with the lugs 50 on the disc 48 is seated on one face of the disc. Each aperture 58 is formed by oppositely disposed V-shaped prongs 60 formed by cutting slits 62 through two opposed corners of each of the apertures 58, the apertures being more or less diamond-shaped, and the slits being parallel with a diagonal. Before slitting, the apertures 58 are slightly smaller than the lugs 50, so that pressing on of the wiper plate 56, formed of a resilient material such as nickel silver, locks the plate in position on the disc by the biting action of the prongs 60 on the lugs 50. The wiper plate 56 has a central aperture 64 slightly larger than the aperture 52 in the disc 48.

A slit 66, in the form of a concentric arc and terminating in a radial slit 68 intersecting the central aperture 64, forms a contact arm 70 which is bent outward at a small angle from the body of the wiper plate 56 and has a more or less U-shaped bend 72 at the outer end.

Although, as previously stated, the wiper 56 is generally circular, there is an outward tapered divergence from circularity of the perimeter, as shown at 74, terminating in a more or less radial end 76 which returns to the generally circular body. An arc-shaped slit 78 in this portion of the plate 56 forms a contact arm 80, likewise bent outwardly at a fairly small angle from the wiper plate, and having a V-shaped bend 82 at the outer end thereof forming a resistance-contacting surface of fairly small width.

Seated on the inner surface of the plate 10 between the shaft 14 and resistance element 22 is a slip ring 84 in the form of a flat annular ring, and a terminal strip 86, formed integrally with the ring, extends back through an aperture 88 in the plate 10, the outer end constituting a soldering terminal. As shown in FIGURES 1 and 6, an L-shaped slit 90 in the region of the strip 86 at the outer surface of the plate 10 forms in the strip 86 a tongue or prong 92 which is slightly bent away from the plane of the terminal strip 86 to lock the slip ring and its terminal firmly in place in the assembly.

The potentiometer thus described has at the inner end of the shaft a gear 94, which is the final gear in a reduction chain later to be described.

In view of the statements earlier made as to the manner in which the present invention solves the problem of ambiguity and erratic fluctuation in wiper-voltage in the passage of the wiper over the region of the resistance element containing the two ends, the manner of operation of the illustrated devices, best seen in this respect in FIGURE 5, will readily be understood. In the view of FIGURE 5, the wiper is moving from left to right. In the position (not shown) where the V-shaped contact portion 82 approaches the pin 30, the wiper is subjected to camming action by the pin 30 commencing with the point where the forward surface of the V-shaped contact 82 strikes the upper edge of pin 30 (thus shorting a few turns); at this point the wiper contact surface is lifted from the resistance wire and the contact 82 thereafter makes contact only with the pin 30 until it reaches the position shown in solid form in FIGURE 5, at which it is about to be withdrawn from the pin 30. Immediately upon such withdrawal, as shown in dotted form in FIGURE 5, the contact snaps downward to contact the opposite end 40 of the winding. However, it will be noted that this snap action is slightly circular about a radius generally corresponding to the extension of the contact arm 80 from the plate 56, so that the motion of the contact as it snaps off the pin 30 is also slightly forward, thus assuring that there will be no simultaneous contact between the wiper and both windings.

FIGURE 7 shows a telemetering assembly employing three potentiometers of the general construction described, the gear 94 being the last gear in the reduction train. The base plate 10 is of a shape which may be described as that of a "cashew nut," having parallel curved sides and substantially semi-circular ends. The potentiometer already described is mounted at one end, as shown in FIGURE 2. Resistance elements 96 and 98, of substantially the same construction as that already described, are respectively at the central portion and the opposite end of the base plate. Gears 100 and 102 are affixed to the shafts of these potentiometers, and in all other respects the construction is the same as that previously described, except that the gear train is designed so that the input shaft, whose rotation is to be monitored, is connected by gearing (not shown) to the gear 102, so that this potentiometer is first in the train, and successive potentiometers (the one already described being the last) are geared down by a ratio of ten to one. Thus the wiper voltages on the three potentiometers are a decimal-system indication of the total shaft rotation of the input to the telemetering indicator. The shafts may themselves be associated with suitable dials and needles, so that direct visual indication is given in addition to the telemetering voltages.

It will be seen that the construction thus far described is extremely simple and economical and the nature of the improvement made in eliminating problems encountered in the region where the ends of the resistance element are closely spaced will be readily understood. Many modifications, of far different appearance and details of operation, may of course be made, although believed to be less advantageous for most purposes than the preferred construction. Examples of other embodiments employing the basic teachings of the invention are illustrated in FIGURES 8 through 10.

FIGURE 8 shows schematically an embodiment of the broader teachings of the invention which differs from that previously described in a number of respects. It will be seen that in the embodiment previously described, the "step" earlier discussed between the ends of the resistance element is provided by the pin 30. In the embodiment of FIGURE 8, the groove or other support for the resistance element is made non-uniform in depth, so that one end 104 of the winding is spaced from the other end 105 in the direction of motion of the wiper contact 107, which in this case moves directly perpendicular to the contact point with the windings. In this embodiment, the contact lug or terminal 106 is provided with a small lip portion to assure that the contact wiper 107 cannot possibly short the element.

In the embodiment of FIGURE 9, the resistance element, although remaining generally circular, is slightly spiral, with the ends overlapping, the end 108 being spaced from the end 110 in the direction of contact pressure in a manner somewhat similar to the corresponding "step" of FIGURE 8. In FIGURE 9, however, the contact is sufficiently thick (in the direction normal to the "width" heretofore discussed) so that it could contact both ends except for the presence of the step just mentioned. Under these circumstances, again, the contact 80 snaps from the winding end 110 to the winding end 108.

In the device of FIGURE 10, the winding orientation used is similar to the slight spiraling described above in FIGURE 9. However, here the "step" is provided in a different manner. The entire resistance element 112 is in the same plane throughout its length, including the ends 114 and 116. The wiper is mounted on a hub 118 by an insulating pin 120 and is in the form of a cup-shaped sleeve 122, biased outwardly by a compressed spring 123 and having a contacting protrusion 124. The wiper moves radially, being guided by a cam surface in the form of a conductive lining 126 on a suitably formed recess in the base plate 128, the lining 126 also serving as a slip ring. The step 130 in the cam abruptly moves the wiper contact protrusion 124 from one end of the element to the other as the wiper moves in its counterclockwise path.

Many other applications of the broader aspects of the invention will be apparent to those skilled in the art. For example, although the embodiments herein described are potentiometers designed for unidirectional rotation, adaptation of the invention for bidirectional application may readily be made. Accordingly, the scope of the invention shall not be limited to the particular embodiments specifically discussed, but shall extend to the structures described in the appended claims, and equivalents thereof.

What is claimed is:

1. In a rotary potentiometer having a resistance element of generally circular shape and a movable wiper in contact with the element and free for more than full-turn relative rotation, the ends of the resistance element being mutually insulated, the improved construction wherein the ends of the resistance element are spaced by a gap in said generally circular shape greater than the width of the contact surface of the wiper to avoid shorting of the element by the wiper and having means operable upon progression of the wiper over one end portion of the resistance element to simultaneously transfer the wiper out of electrical contact with said end portion and into electrical contact with the other end portion, the wiper being in electrical contact connection with the element in all rotational positions, and the completion of the transfer being independent of further rotary motion when electrical contact with said one end portion is broken.

2. In a potentiometer assembly, a plurality of potentiometers each having a resistance element of generally circular shape, a wiper in contact with the element, and a shaft for producing relative rotation between the element and the wiper, the resistance elements each having mutually insulated ends at a small region of the rotational path of the wiper, and reduction gears interconnecting successive shafts, at least the potentiometer having the slowest of the shafts having means operable in response to motion of the wiper through the portion of its path containing said region to transfer the wiper out of electrical contact with one end portion of the resistance element and into electrical contact with the other end portion thereof, said transfer means being independent of motion of the shaft between initiation and completion of the transfer.

3. In a potentiometer having a resistance element of generally circular shape having mutually insulated end terminals, a wiper, and an operating member for producing rotation of the contact point of the resistance element, the improved construction having means responsive to passage of the wiper over one end portion of the element toward the other to snap the wiper out of contact with said one end portion and into contact with said other end portion, the end terminals being connected to said end portions substantially at the respective points between which wiper contact is respectively made and broken.

4. The potentiometer of claim 3 wherein the snapping means includes a cam surface and a spring, the cam surface having a step portion in the rotational region corresponding to the presence of the wiper in the region of said end portion.

5. The potentiometer of claim 4 wherein the spring urges the wiper into contact with the element, the cam surface step portion comprising an offset between the ends of the resistance element at least partially in the direction of the urging of the spring, so that the contact snaps from one end portion to the other as it passes the offset.

6. The potentiometer of claim 5 wherein the resistance element has all portions thereof other than said end portions of equal radius and in the same plane, the offset comprising a conducting protrusion on one end of the element electrically connected to said end.

7. The potentiometer of claim 5 wherein the spring comprises a resilient arm supporting the wiper contact and extending therefrom in a direction to swing the wiper contact in an arc away from the offset upon release by passage of the offset.

8. The potentiometer of claim 7 wherein the wiper contact is integral with the arm and formed by a V-shaped bend at the end thereof.

9. The potentiometer of claim 8 wherein the resistance element has a small gap between the ends, a conducting pin extending through the gap constituting one end of the resistance element and providing the offset.

10. A potentiometer assembly comprising a unitary insulating bearing plate, a plurality of spaced generally circular resistance elements on one surface of the plate, shafts extending through the centers of the resistance elements and mounted in apertures in the plate, each shaft carrying a wiper in rotatable contact with the resistance element, slip rings on the plate concentric with the resistance elements, each wiper having a slip ring contact in sliding contact with its respective slip ring, terminals extending back through the plate connected to the element ends and to the slip rings, and a gear train interconnecting all of the shafts.

11. In a potentiometer assembly:
(a) a plurality of rotary potentiometers each having a resistance element of generally circular shape with insulatingly spaced end portions, a wiper in contact with the element and a shaft for producing relative rotation between the element and the wiper, and
(b) reduction gears interconnecting successive shafts,
(c) at least the potentiometer with the slowest of the shafts having snap-action mechanism operable to transfer the wiper substantially instantaneously from one end portion to the other end portion of the resistance element through the region of the insulating spacing,
(d) such mechanism being independent of shaft motion during the entire time of transfer.

12. In a potentiometer:
(a) a resistance element in the general form of a closed figure but having the ends thereof insulatingly spaced,
(b) a wiper assembly having a spring urging its contact portion against the resistance element, and
(c) a terminal member of conducting material at one end of the resistance element and electrically connected thereto,
(d) said terminal member having a contact surface portion engaged by the wiper contact spaced inwardly from the other end of the resistance element in the direction of urging of the spring,
whereby the wiper contact is transferred between the terminal member and said other end across the insulating spacing even in the absence of motion of the wiper assembly after the wiper contact leaves the terminal member.

13. In a potentiometer:
(a) a resistance element in the general form of a closed figure but having its end portions mutually insulated,
(b) a wiper assembly having a contact portion movable over the resistance element, and
(c) a transfer mechanism at least partially on the wiper assembly constructed and arranged to transfer the contact portion between conditions of contact with the respective end portions,
(d) said transfer mechanism being independent of overall motion of the wiper assembly between initiation and completion of the transfer.

14. The potentiometer of claim 13 having:
(e) the resistance element in the form of a plane circle, the insulation between end portions forming a gap therein,
(f) the contact portion of the wiper assembly spring-biased into contact with the resistance element, and
(g) a conductor in the gap electrically connected to one end portion and insulated from the other and forming a sharp-edged protuberance from the contacted region of the element,
whereby the transfer mechanism is formed in a simple and inexpensive manner.

References Cited in the file of this patent
UNITED STATES PATENTS

| 2,498,967 | Schaefer | Feb. 28, 1950 |
| 2,729,728 | Koenig | Jan. 3, 1956 |
| 2,912,663 | Van Alen | Nov. 10, 1959 |

FOREIGN PATENTS

| 1,103,756 | France | June 1, 1955 |